(12) United States Patent
Huang (10) Patent No.: US 11,015,639 B1
(45) Date of Patent: May 25, 2021

(54) CONCEALABLE BUCKLE APPARATUS

(71) Applicant: Han-Ching Huang, Taichung (TW)

(72) Inventor: Han-Ching Huang, Taichung (TW)

( * ) Notice: Subject to any disclaimer, the term of this patent is extended or adjusted under 35 U.S.C. 154(b) by 0 days.

(21) Appl. No.: 16/719,959

(22) Filed: Dec. 18, 2019

(51) Int. Cl.
*F16B 45/00* (2006.01)
*B60P 7/08* (2006.01)

(52) U.S. Cl.
CPC ............ *F16B 45/00* (2013.01); *B60P 7/0807* (2013.01)

(58) Field of Classification Search
CPC ................................ F16B 45/00; B60P 7/0807
See application file for complete search history.

(56) References Cited

U.S. PATENT DOCUMENTS

| | | | | |
|---|---|---|---|---|
| 3,708,838 A * | 1/1973 | Gonzalez | ............ | A44B 11/2511 24/637 |
| 4,903,876 A * | 2/1990 | Bott | .......................... | B60R 9/00 224/321 |
| 6,665,911 B1 * | 12/2003 | Huang | .................. | B60P 7/0807 24/163 K |
| 6,783,313 B1 | 8/2004 | Huang | | |

* cited by examiner

*Primary Examiner* — Robert Sandy
*Assistant Examiner* — David M Upchurch
(74) *Attorney, Agent, or Firm* — Bruce Stone LLP; Joseph A. Bruce (57) ABSTRACT

A conceal buckle apparatus includes a box, a buckle, an axle and a locking element. The box includes a rim, a back plate and a connective plate formed between the rim and the back plate. An opening includes a portion in the connective plate and another portion in the back plate. The buckle includes two lateral portions extending out of the recess via the opening and a middle portion extending perpendicular to the lateral portions. The axle is connected to the lateral portions of the buckle and formed with two terminal sections each of which comprises at least three faces. The locking element is connected to the box and formed with five contact portions. Two of the contact portions are in contact with two of the faces of the axle when the lateral portions of the buckle extend perpendicular or parallel to the back plate.

5 Claims, 10 Drawing Sheets

CONCEALABLE BUCKLE APPARATUS

BACKGROUND OF INVENTION

1. Field of Invention

The present invention relates to a buckle used in a vehicle and, more particularly, to a concealable buckle apparatus.

2. Related Prior Art

U.S. Pat. No. 6,783,313 issued to the applicant of the present application discloses a concealable buckle apparatus 1 used in a vehicle 60. The concealable buckle apparatus 1 includes a panel 20, a locking element 30, a buckle 40 and a shaft 50. The panel 20 includes four walls 25 formed between a margin 22 and a bottom 24. The margin 22 and the bottom 24 both extend vertically when the margin 22 is attached to the vehicle 60. The bottom 24 and the walls 25 provide a recess 21. An upper one of the walls 25 (the "upper wall 25") is formed with two slots 28. The locking element 30 includes a first portion 32, a second portion 34 and a third portion 36. The third portion 36 of the locking element 30 is attached to the bottom 24. The second portion 34 of the locking element 30 keeps the first portion 32 of the locking element 30 in contact with the shaft 50 that is located behind the bottom 24 or on the wall 25. The buckle 40 is a U-shaped element including a central portion 44 inserted in the recess 21 and two lateral portions 42 extending from the recess 21 via the slots 28 and connected to the shaft 50. In an idle position, the central portion 44 of the buckle 40 is inserted in the recess 21 as the shaft 50 is located between the wall 25 and the third portion 36 of the locking element 30. In a working position, the central portion 44 of the buckle 40 is located out of the recess 21 as the shaft 50 is located between the bottom 24 and the third portion 36 of the locking element 30. However, the buckle 40 is slack and makes noise no matter it is in the idle or working position.

The present invention is therefore intended to obviate or at least alleviate the problems encountered in prior art.

SUMMARY OF INVENTION

It is the primary objective of the present invention to provide a silent concealable buckle apparatus.

To achieve the foregoing objective, the conceal buckle apparatus includes a box, a buckle, an axle and a locking element. The box includes a rim, a back plate and a connective plate formed between the rim and the back plate. An opening includes a portion in the connective plate and another portion in the back plate. The buckle includes two lateral portions extending out of the recess via the opening and a middle portion extending perpendicular to the lateral portions. The axle is connected to the lateral portions of the buckle and formed with two terminal sections each of which comprises at least three faces. The locking element is connected to the box and formed with five contact portions. The first and second contact portions are in contact with two of the faces of the axle when the middle portion of the buckle is located out of the recess and the lateral portions of the buckle extend perpendicular to the back plate. The fourth and fifth contact portions are in contact with two of the faces of the axle when the middle portion of the buckle is inserted in the recess and the lateral portions of the buckle extend parallel to the back plate.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
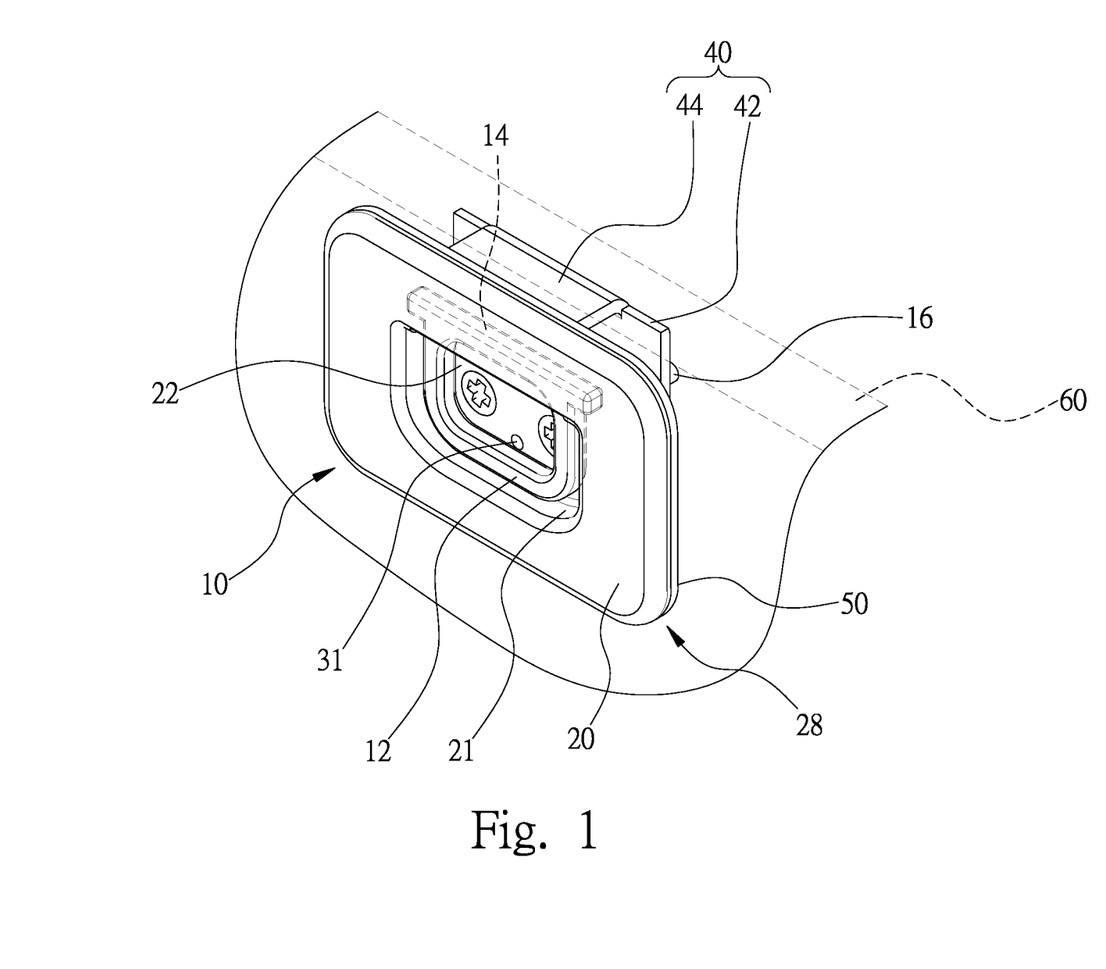
FIG. 1 is a perspective view of a concealable buckle apparatus according to the first embodiment of the present invention.
Figure 2:
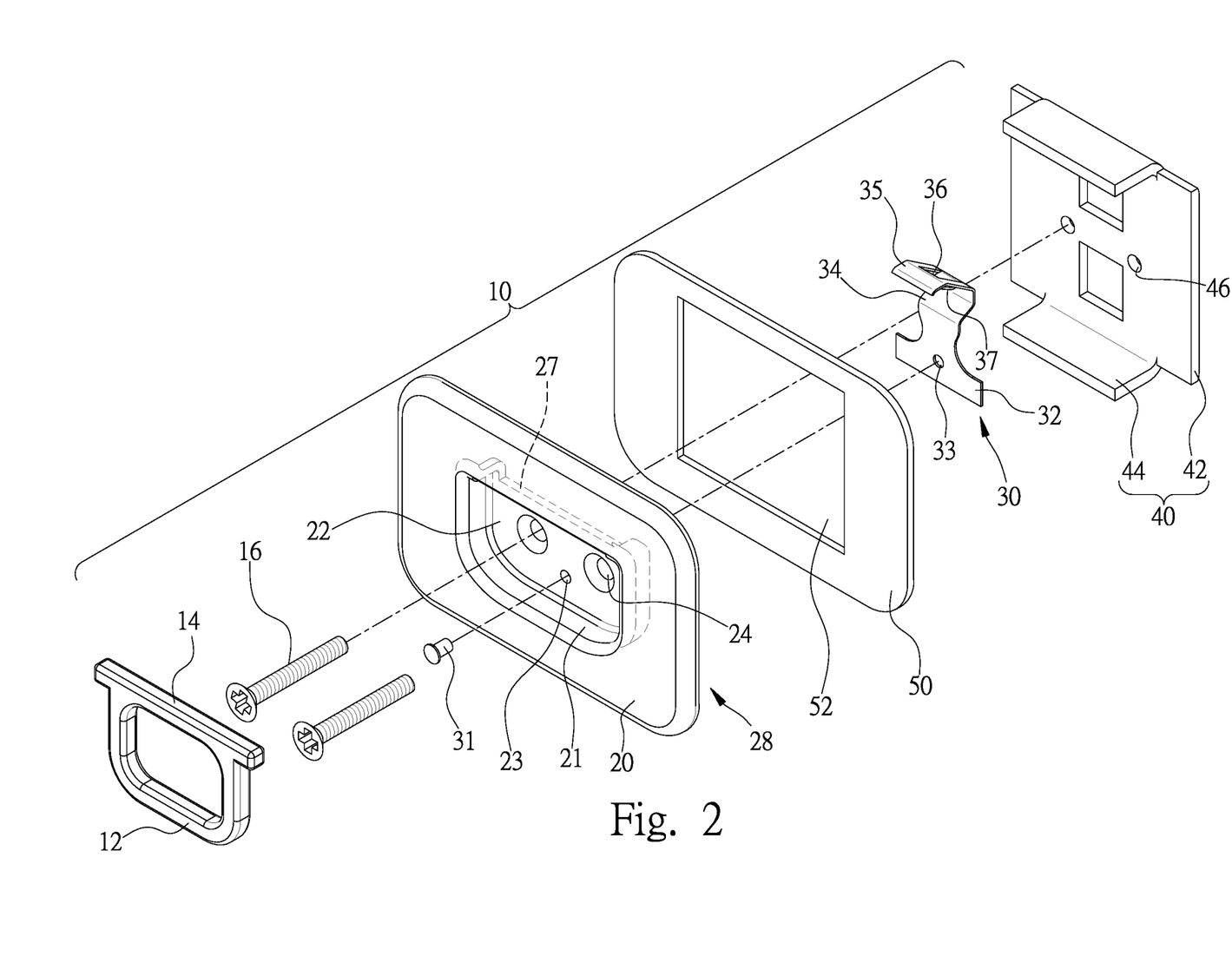
FIG. 2 is an exploded view of the concealable buckle apparatus shown in FIG. 1.

Referring to FIGS. 1 and 2, a concealable buckle apparatus 10 includes a buckle 12, a box 28, a locking element 30, a cover 40 and a gasket 50 according to the preferred embodiment of the present invention. The buckle 12 is a U-shaped element including a middle portion formed between two lateral portions. The lateral portions of the buckle 12 are connected to an axle 14. The axle 14 is made in one piece with the buckle 12. The axle 14 includes two terminal sections extending beyond the lateral portions of the buckle 12.

Figure 4:
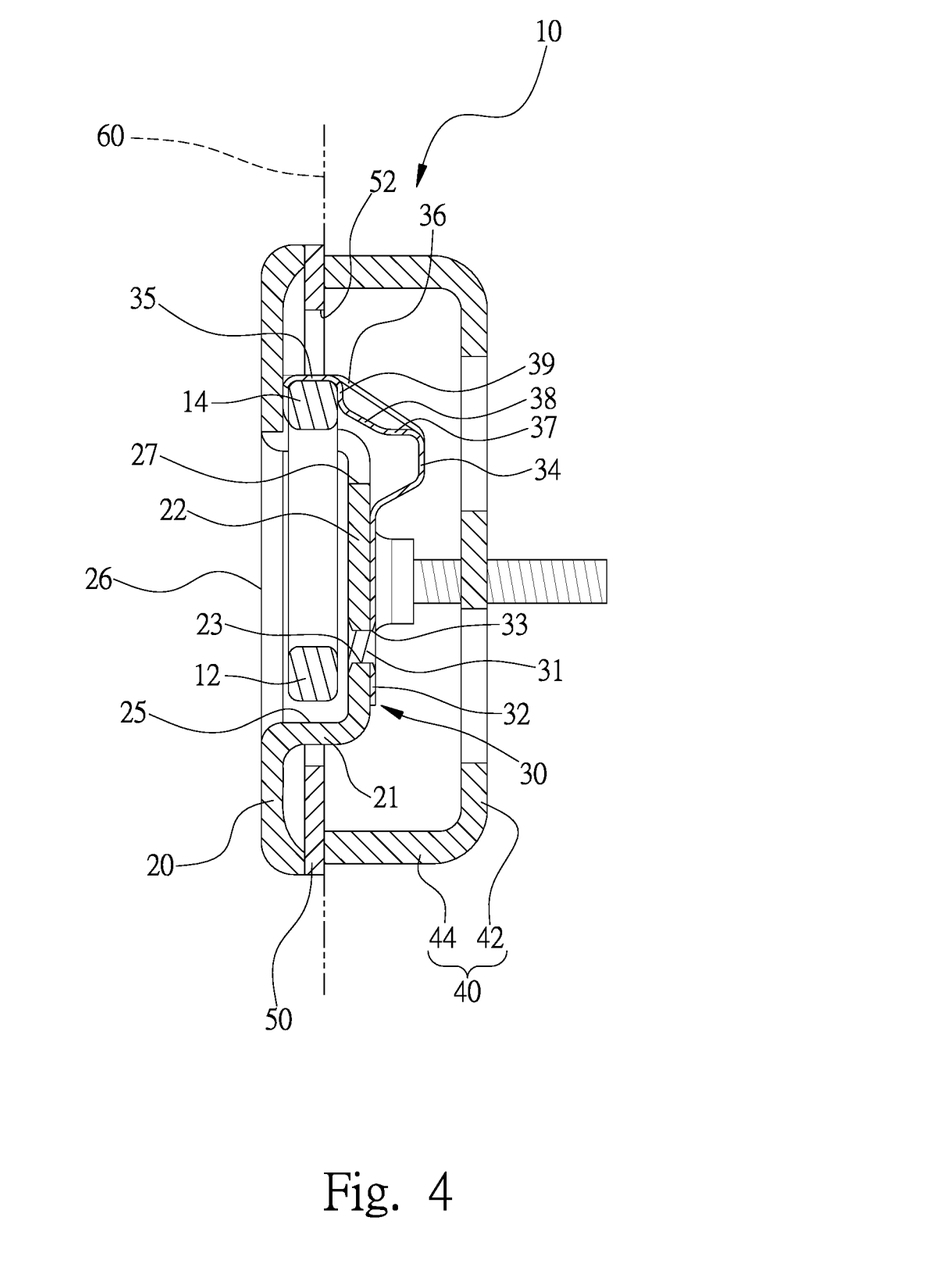
FIG. 4 is a cross-sectional view of the concealable buckle apparatus shown in FIG. 1.

Referring to FIGS. 2 and 4, the box 28 includes four connective plates 21 formed between a back plate 22 and a rim 20. The rim 20 is an annular flat element extending around a window 26. The back plate 22 extends parallel to the rim 20. The connective plates 21 and the back plate 22 together provide a recess 25 in communication with the window 26. The back plate 22 includes an aperture 23 and two countersink holes 24. The box 28 further includes an opening 27 including a section in an upper one of the connective plates 21 (the "upper connective plate 21") and another section in the back plate 22.

Figure 3:
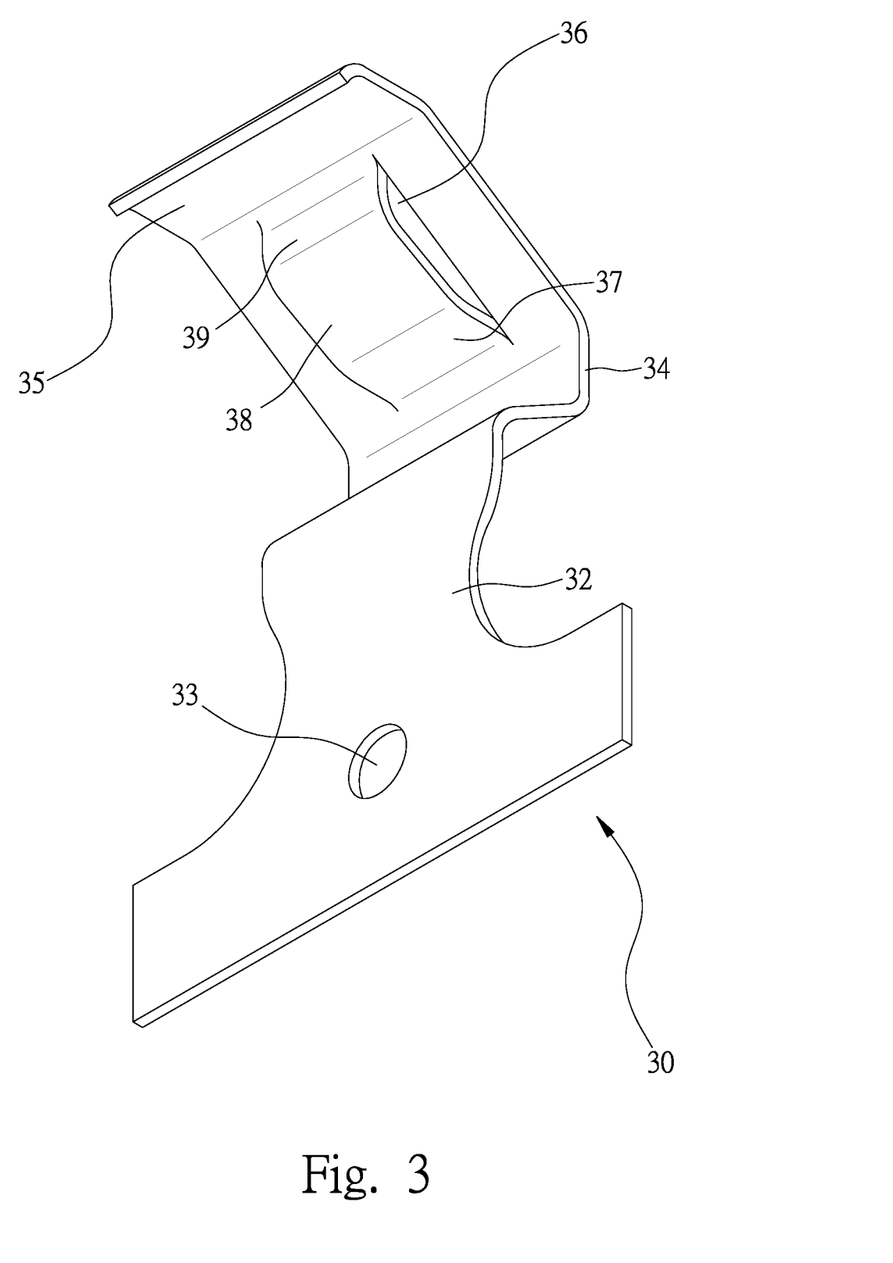
FIG. 3 is a perspective view of a locking element of the concealable buckle apparatus shown in FIG. 2.

Referring to FIG. 3, the locking element 30 includes a root 32, a first contact portion 34 extending parallel to the root 32, an intermediate portion formed between the root 32 and the first contact portion 34, a second contact portion 37 extending from the first contact portion 34 at the right angle, a third contact portion 38 extending from the second contact portion 37 at an angle of 135 degrees, a fourth contact portion 39 extending from the third contact portion 38 at an angle of 135 degrees, and a fifth contact portion 35 extending from the fourth contact portion 39 at the right angle. The root 32 is formed with an aperture 33. The second, third and fourth contact portions 37, 38 and 39 are made by punching an opening 36 in the locking element 30 corresponding to the second, third and fourth contact portions 37, 38 and 39.

Referring to FIG. 2, the cover 40 includes a major portion 42 and two minor portions 44. The minor portions 44 of the cover 40 extend perpendicular to the major portion 42 of the same. The major portion 42 of the cover 40 includes two apertures 46.

The gasket 50 is shaped corresponding to the box 28. The gasket 50 includes a window 52 between two transverse portions (not numbered). The window 52 is larger than the back plate 22.

Referring to FIGS. 1 and 4, the buckle 12 is inserted in the recess 25 via the window 26. The axle 14 is located out of the recess 25 via the opening 27. Thus, the axle 14 is supported on the upper connective plate 21. The terminal sections of the axle 14 extend beyond two lateral ones of the connective plates 21. The buckle 12 falls due to weight and is hence concealed in the recess 25.

The locking element 30 is located behind the back plate 22. A fastener 31 is inserted in the aperture 23 of the back plate 22 and the aperture 33 of the root 32. Thus, the root 32 of the locking element 30 is firmly connected to a rear face of the back plate 22. The fastener 31 is preferably a rivet.

Two screws 16 are inserted in two screw holes (not shown) of a vehicle 60 via the countersink holes 24 of the back plate 22, the window 52 of the gasket 50, and the apertures 46 of the cover 40. Thus, the concealable buckle apparatus 10 is connected to the vehicle 60.

Referring to FIG. 4, the minor portions 44 of the cover 40 keep the major portion 42 of the cover 40 at an appropriate distance from the back plate 22. Thus, the major portion 42 of the cover 40 does not interfere with the interaction between the axle 14 and the locking element 30. The connective plates 21 are inserted in the window 52. Each of the transverse portions of the gasket 50 is sandwiched between a corresponding portion of the rim 20 of the box 28 and a corresponding one of the minor portions 44 of the cover 40. Thus, the gasket 50 is used as a buffer to reduce shocks exerted on the box 28 from the vehicle 60.

The axle 14 includes a square profile, i.e., the axle 14 includes four faces. The fifth contact portion 35 is in contact with one of the faces of the axle 14 and the fourth contact portion 39 is in contact with another one of the faces of the axle 14. The locking element 30 is deformed and loaded by the axle 14, thereby abutting the fifth contact portion 35 against one of the faces of the axle 14 and pressing an opposite one of the faces of the axle 14 on the upper connective plate 21. That is, the axle 14 is compressed between the fifth contact portion 35 and the upper connective plate 21. In addition, the locking element 30 abuts the fourth contact portion 39 against another one of the faces of the axle 14, thereby pressing an opposite one of the faces of the axle 14 on the upper connective plate 21. That is, the axle 14 is compressed between the fourth contact portion 39 and the rim 20. Thus, the axle 14 is kept in an angle, and so is the buckle 12. Hence, the buckle 12 is firmly kept in position and prevented from rattling that would otherwise cause noise.

Figure 5:
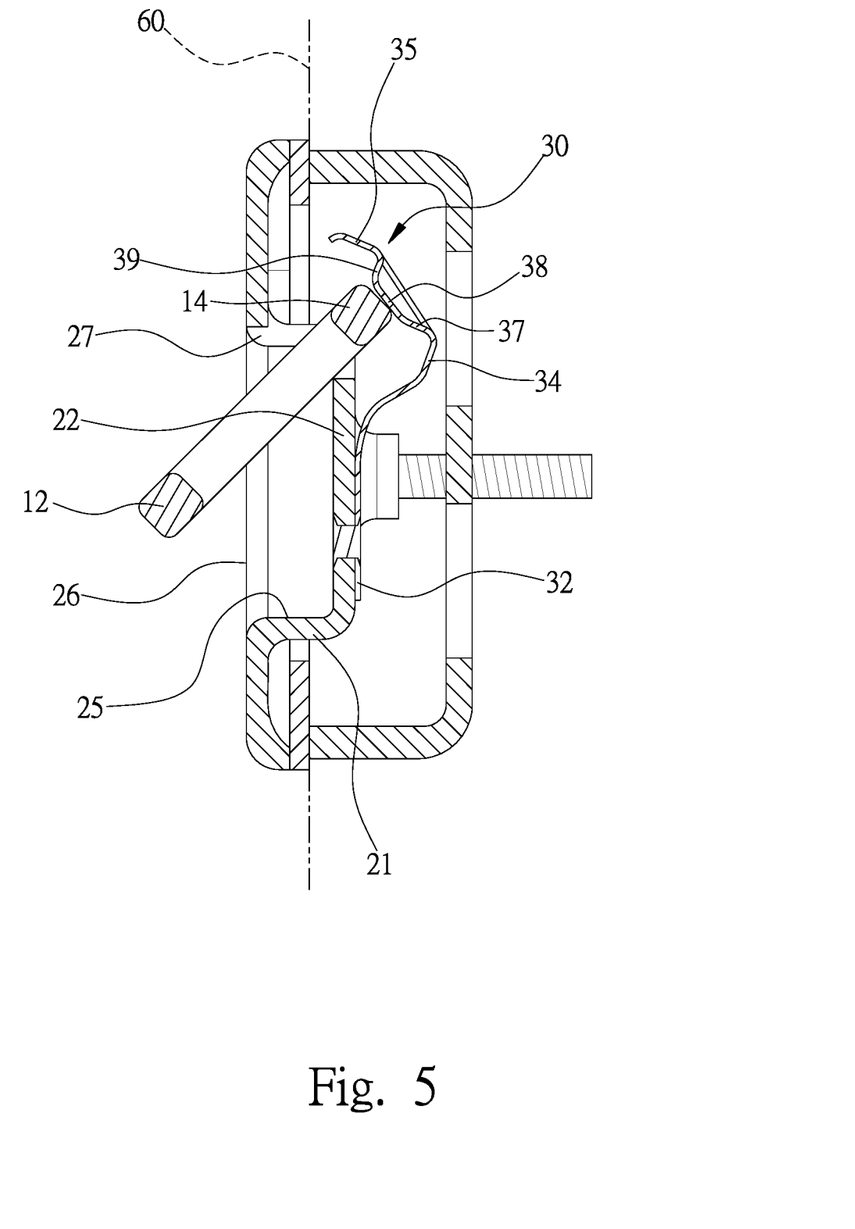
FIG. 5 is a cross-sectional view of the concealable buckle apparatus in another position than shown in FIG. 4.

Referring to FIG. 5, the buckle 12 is in another angle than shown in FIG. 4. The middle portion of the buckle 12 is moved out of the recess 25 via the window 26. Now, the axle 14 is located at a bent portion of the box 28 between the upper connective plate 21 and the back plate 22. The axle 14 is removed from the fifth contact portion 35 and the fourth contact portion 39. Instead, the axle 14 is in contact with the third contact portion 38. The locking element 30 is more deformed and loaded in the position shown in FIG. 5 than in the position shown in FIG. 4.

Figure 6:
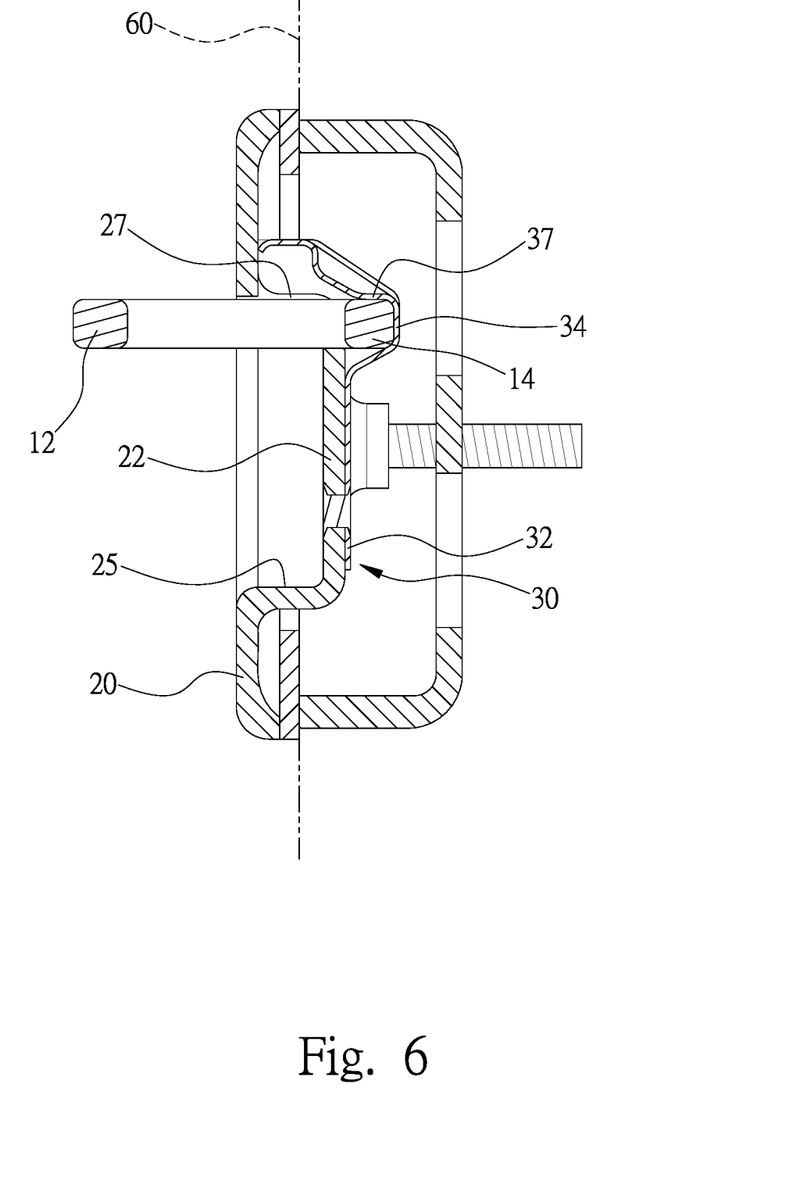
FIG. 6 is a cross-sectional view of the concealable buckle apparatus in another position than shown in FIG. 5.
Figure 7:
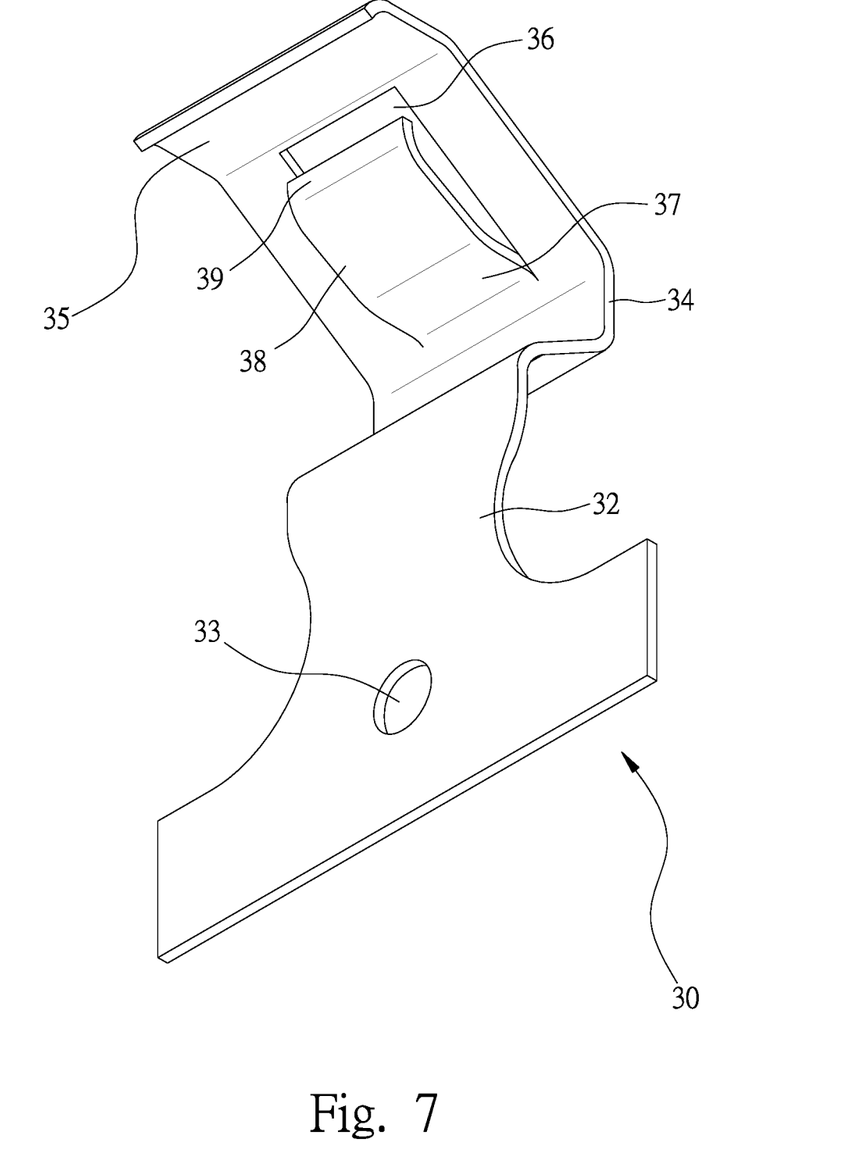
FIG. 7 is a perspective view of a locking element according to the second embodiment of the present invention.

Referring to FIG. 6, the buckle 12 is in another angle than shown in FIG. 5. The middle portion of the buckle 12 is located out of the recess 25. The first contact portion 34 presses the axle 14 against the rear face of the back plate 22. That is, the axle 14 is compressed between a rear face of the back plate 22 and the first contact portion 34. The second contact portion 37 presses the lateral portions of the buckle 12 against an upper edge of the back plate 22 located by the opening 27. Thus, the axle 14 is kept in the angle, and so is the buckle 12. The lateral portions of the buckle 12 are firmly kept in a horizontal position and prevented from rattling that would otherwise cause noise.

Referring to FIGS. 7 through 10, there is shown a concealable buckle apparatus 10 according to a second embodiment of the present invention. The second embodiment is like the first embodiment except that the fourth contact portion 39 is not connected to the fifth contact portion 35. Thus, the second, third and fourth contact portions 37, 38 and 39 can be pivoted relative to the first contact portion 34.

Figure 8:
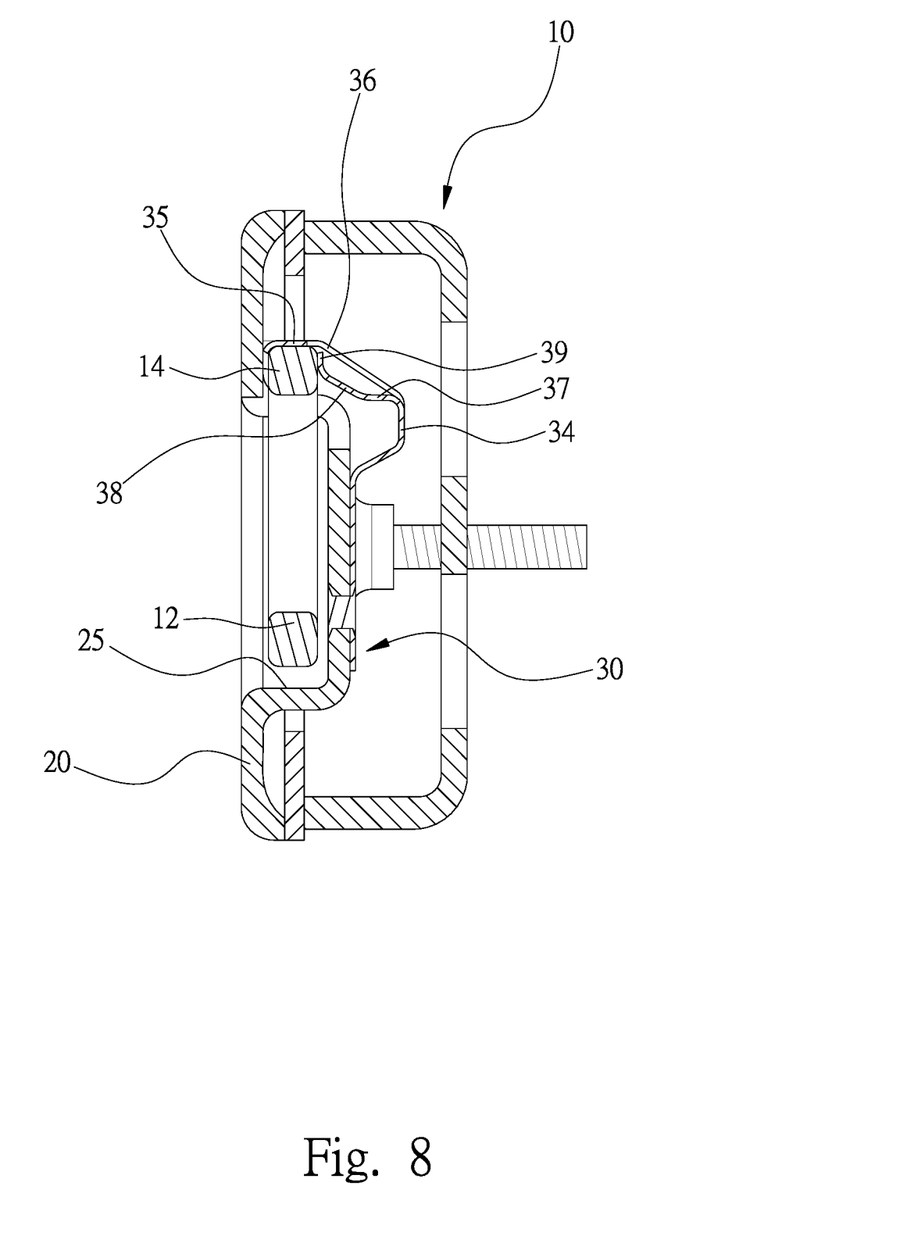
FIG. 8 is a cross-sectional view of a concealable buckle apparatus including the locking element shown in FIG. 7.

Referring to FIG. 8, the first contact portion 34 causes the fifth contact portion 35 to press the axle 14 on the upper connective plate 21. The fourth contact portion 39 presses the axle 14 against the rim 20. Thus, the buckle 12 is prevented from rattling in the recess 25.

Figure 9:
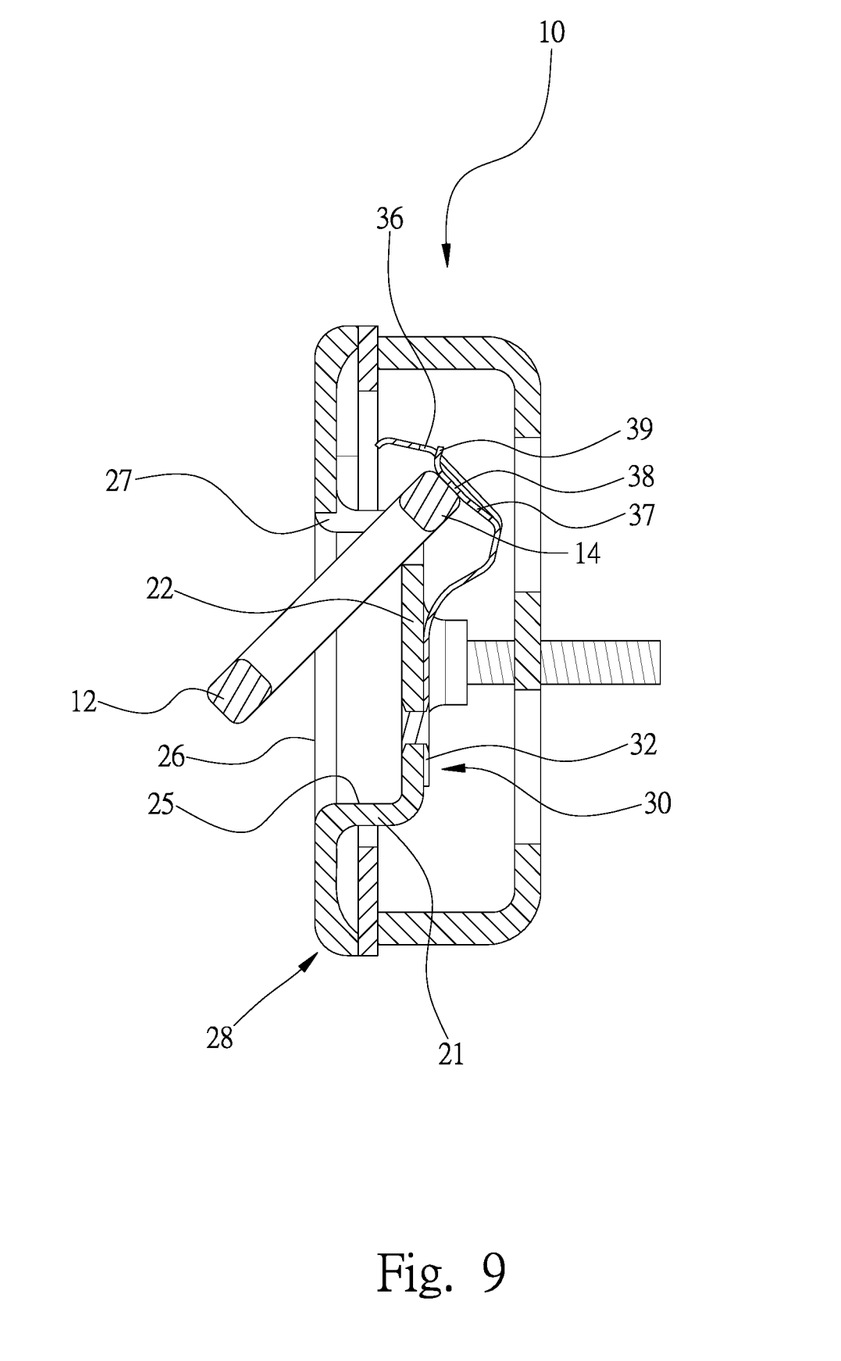
FIG. 9 is a cross-sectional view of the concealable buckle apparatus in another position than shown in FIG. 8.

Referring to FIG. 9, the buckle 12 is in another angle than shown in FIG. 8. The middle portion of the buckle 12 is moved out of the recess 25 via the window 26. The axle 14 is sandwiched between the bent portion of the box 28 and the third contact portion 38.

Figure 10:
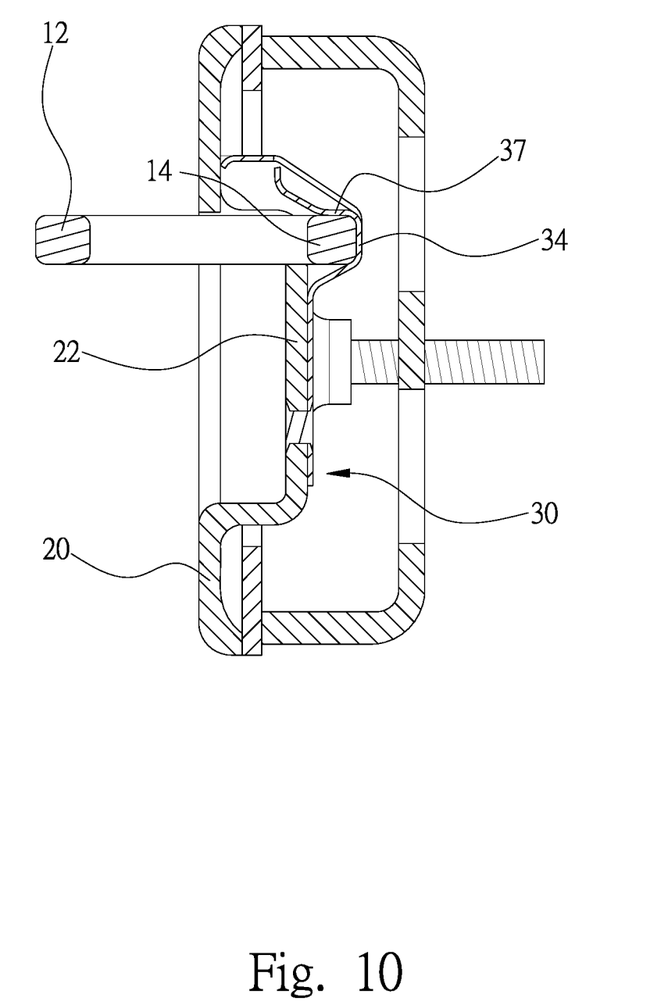
FIG. 10 is a cross-sectional view of the concealable buckle apparatus in another position than shown in FIG. 9.

Referring to FIG. 10, the buckle 12 is in another angle than shown in FIG. 9. The middle portion of the buckle 12 is located out of the recess 25. The first contact portion 34 presses the axle 14 against the rear face of the back plate 22. That is, the axle 14 is compressed between a rear face of the back plate 22 and the first contact portion 34. The second contact portion 37 presses the lateral portions of the buckle 12 against an upper edge of the back plate 22 located by the opening 27. Thus, the axle 14 is kept in the angle, and so is the buckle 12. The lateral portions of the buckle 12 are firmly kept in a horizontal position and prevented from rattling that would otherwise cause noise.

The present invention has been described via the illustration of the embodiments. Those skilled in the art can derive variations from the embodiments without departing from the scope of the present invention. Hence, the embodiments shall not limit the scope of the present invention defined in the claims.

The invention claimed is:
1. A concealable buckle apparatus comprising:
   a box comprising a rim, a back plate, a connective plate formed between the rim and the back plate, and an opening with a portion in the connective plate and another portion in the back plate;
   a buckle comprising two lateral portions extending out of the recess via the opening and a middle portion extending perpendicular to the lateral portions;
   an axle connected to the lateral portions of the buckle and formed with two terminal sections each of which comprises at least three faces;
   a locking element connected to the box and formed with a first contact portion, a second contact portion extending from the first contact portion, a third contact portion extending from the second contact portion, a fourth contact portion extending from the third contact por- tion, a fifth contact portion extending from the fourth contact portion, and a root formed next to the first contact portion; and a fastener inserted in the root of the locking element and the back plate of the box;

wherein the first and second contact portions are in contact with two of the faces of the axle when the middle portion of the buckle is located out of the recess and the lateral portions of the buckle extend perpendicular to the back plate, and the fourth and fifth contact portions are in contact with two of the faces of the axle when the middle portion of the buckle is inserted in the recess and the lateral portions of the buckle extend parallel to the back plate.

2. The concealable buckle apparatus according to claim 1, wherein the third contact portion is in contact with one of the faces of the axle when the middle portion of the buckle is located out of the recess and the lateral portions of the buckle does not extend perpendicular to the back plate.

3. The concealable buckle apparatus according to claim 1, wherein each of the terminal sections of the axle comprises four faces.

4. The concealable buckle apparatus according to claim 1, wherein the second, third and fourth contact portions are made by punching an opening in the locking element corresponding to the second, third and fourth contact portions.

5. The concealable buckle apparatus according to claim 4, wherein the opening is located between the first and fifth contact portions.

\* \* \* \* \*